United States Patent
Burgos et al.

(10) Patent No.: US 10,169,683 B2
(45) Date of Patent: Jan. 1, 2019

(54) METHOD AND DEVICE FOR CLASSIFYING AN OBJECT OF AN IMAGE AND CORRESPONDING COMPUTER PROGRAM PRODUCT AND COMPUTER-READABLE MEDIUM

(71) Applicant: THOMSON LICENSING, Issy les Moulineaux (FR)

(72) Inventors: Xavier Burgos, Barcelona (ES); Nezha Kabbaj, Rennes (FR); Francois Le Clerc, L'Hermitage (FR)

(73) Assignee: Thomson Licensing, Issy le Moulineaux (FR)

( * ) Notice: Subject to any disclaimer, the term of this patent is extended or adjusted under 35 U.S.C. 154(b) by 0 days.

(21) Appl. No.: 15/249,435

(22) Filed: Aug. 28, 2016

(65) Prior Publication Data
US 2017/0061252 A1    Mar. 2, 2017

(30) Foreign Application Priority Data
Aug. 28, 2015    (EP) .................................... 15306329

(51) Int. Cl.
*G06K 9/62*    (2006.01)
*G06K 9/00*    (2006.01)
(Continued)

(52) U.S. Cl.
CPC ....... *G06K 9/6267* (2013.01); *G06K 9/00281* (2013.01); *G06K 9/52* (2013.01); *G06K 9/66* (2013.01); *G06T 11/60* (2013.01)

(58) Field of Classification Search
USPC ........................................................ 382/159
See application file for complete search history.

(56) References Cited

U.S. PATENT DOCUMENTS

| 8,948,517 B2 | 2/2015 | Lin et al. |
| 2009/0220157 A1 | 9/2009 | Kato et al. |

(Continued)

OTHER PUBLICATIONS

Smith et al., "Nonparametric Context Modeling of Local Appearance for Pose- and Expression-Robust Facial Landmark Localization", 2014 IEEE Conference on Computer Vision and Pattern Recognition (CVPR), Columbus, Ohio, Jun. 23, 2014, pp. 1741-1748.

(Continued)

*Primary Examiner* — Jerome Grant, II
(74) *Attorney, Agent, or Firm* — Vincent E. Duffy

(57) ABSTRACT

The disclosure relates to a method for classifying an object of a current image, a plurality of first landmarks representative of the shape of the object being associated with the current image, a first unique identifier being associated with each first landmark. According to the disclosure, the method includes, for at least a first landmark, a step of obtaining at least a first descriptor describing an area of the current image having the at least first selected landmark. Then, the first landmark is selected according to its first identifier, and when its first identifier corresponds to a second identifier of a second landmark, a second descriptor is used in a classifier for classifying the object. Finally, the method determines information representative of confidence of the shape according to the first descriptor and according to weighting information associated with the second descriptor.

23 Claims, 3 Drawing Sheets

(51) Int. Cl.
    *G06K 9/52*        (2006.01)
    *G06K 9/66*        (2006.01)
    *G06T 11/60*     (2006.01)

(56) References Cited

U.S. PATENT DOCUMENTS

| | | | |
|---|---|---|---|
| 2010/0104158 A1* | 4/2010 | Shechtman | G06K 9/46 382/131 |
| 2012/0099790 A1 | 4/2012 | Lyuh et al. | |
| 2013/0022277 A1 | 1/2013 | Morishita | |
| 2014/0010410 A1* | 1/2014 | Sakurai | G06K 9/00362 382/103 |
| 2014/0044359 A1 | 2/2014 | Rousson | |
| 2014/0112530 A1* | 4/2014 | Yadani | G06K 9/00624 382/103 |
| 2014/0147022 A1 | 5/2014 | Zhou et al. | |
| 2014/0355821 A1 | 12/2014 | Solem et al. | |
| 2015/0125052 A1* | 5/2015 | Wong | G06K 9/46 382/128 |
| 2015/0131873 A1 | 5/2015 | Brandt et al. | |
| 2015/0138078 A1* | 5/2015 | Krupka | G06K 9/00389 345/156 |
| 2015/0169938 A1 | 6/2015 | Yao et al. | |
| 2016/0247034 A1* | 8/2016 | Lee | G06K 9/036 |
| 2016/0275376 A1* | 9/2016 | Kant | G06K 9/6277 |
| 2017/0053156 A1* | 2/2017 | Chen | G06K 9/00234 |
| 2017/0200063 A1* | 7/2017 | Nariyambut Murali | G06K 9/4628 |
| 2017/0243051 A1* | 8/2017 | Chukka | G06K 9/00147 |
| 2017/0300781 A1* | 10/2017 | Lehrmann | G06K 9/6217 |
| 2017/0316281 A1* | 11/2017 | Criminisi | G06K 9/6276 |
| 2017/0323185 A1* | 11/2017 | Bhardwaj | G06T 7/90 |

OTHER PUBLICATIONS

Burgos-Artizzu et al., "Robust face landmark estimation under occlusion", 2013 IEEE International Conference on Computer Vision, Sydney, New South Wales, Australia, Dec. 1, 2013, pp. 1-8.
Rudin, "Boosting", MIT 15.097 Course Notes, Massachusetts Institute of Technology, Open Course Ware, Jan. 2012, pp. 1-12.
Schapire, "A Brief Introduction to Boosting", 16th International Joint Conference on Artificial Intelligence, Stockholm, Sweden, Jul. 31, 1999, pp. 1-6.
Viola et al., "Robust Real-Time Face Detection", International Journal of Computer Vision, vol. 57, No. 2, 2004, pp. 137-154.

\* cited by examiner

US 10,169,683 B2

METHOD AND DEVICE FOR CLASSIFYING AN OBJECT OF AN IMAGE AND CORRESPONDING COMPUTER PROGRAM PRODUCT AND COMPUTER-READABLE MEDIUM

This application claims the benefit, under 35 U.S.C. § 119 of European Patent Application No. 15306329.2, filed Aug. 28, 2015.

1. TECHNICAL FIELD

The present disclosure relates to computer vision and more specifically to the computer vision problem of finding and identifying a given semantic category, i.e. objects, in an image or video sequence, also known as object recognition. More specifically, the present disclosure relates to correctly determining the shape of objects in images.

The principles of the present disclosure find particular application in any field implementing object recognition such as facial animation, human computer interaction, eye gaze correction for video conferencing, face retouching, forensics or detecting an animal and estimating its exact body pose.

2. TECHNICAL BACKGROUND

One of the major benefits of the increase in computational power has been a steady rise in the number of computer vision applications. Computer vision problems formerly impossible to solve in any reasonable amount of time have become more and more feasible.

Efficiently detecting and classifying objects in an image or video sequence is one of the main challenges of computer vision. Detection consists of giving a one-bit answer to the question "Is object/category x in the image?".

Several machine-learning approaches have been applied to this problem, demonstrating significant improvements in object detection accuracy and speed.

In addition, most often just establishing the presence/absence of objects is not enough and one desires to know also its exact locations in the image, or even independently detecting and localizing the parts of which the object are composed.

As disclosed by P. Dollar et al. ("*Cascaded Pose Regression*") IEEE Computer Vision and Pattern recognition 2010 pp 1078-1085, in its simplest form, localization consists of identifying the smallest rectangular region of the image that contains the searched object but more generally, one wishes to recover the object's "shape".

Shape refers to the geometric configuration of articulated objects (and the parts of which they are composed), for example the configuration of the limbs on a human body or the layout of a vehicle. More broadly, shape is any set of systematic and parameterizable changes in the appearance of the object.

To this purpose landmarks estimation methods have been developed. Among such methods, the cascaded pose regression (CPR) technique as disclosed by P. Dollar, as cited above, is used for facial landmarks detection, also called shape estimation (where the term "shape" refers here to the set of landmarks locations characterizing the geometry of the face).

More precisely, the cascaded pose regression (CPR) is formed by a cascade of T regressors $R^1 \cdots {}^T$ that start from a raw initial shape guess $S^0$ and progressively refine estimation, outputting final shape estimation $S^T$. Shape S is represented as a series of P part locations $S_p=[x_p, y_p]$, $p \in 1 \ldots P$. Typically these parts correspond to facial landmarks. At each iteration, a regressor $R^t$ produce an update $\delta S$, which is then combined with previous iteration's estimate $S^{t-1}$ to form a new shape.

During learning, each regressor $R^t$ is trained to attempt to minimize the difference between the true shape and the shape estimate of the previous iteration $S^{t-1}$. The available features depend on the current shape estimate and therefore change in every iteration of the algorithm, such features are known as pose-indexed or shape-indexed features and the key of the CPR technique lies on computing robust shape-indexed features and training regressors able to progressively reduce the estimation error at each iteration.

The robust cascaded pose regression (RCPR) is an algorithm derived from CPR and that deals with occlusions as disclosed by one the inventors, X. P. Burgos-Artizzu et al. ("*Robust face landmark estimation under occlusion*"), IEEE International Conference on Computer Vision, Sydney 2013. This method requires ground truth annotations for occlusion in the training set. So instead of defining a part location by only its x and y coordinates, a visibility parameter is added and can also be learned at the same time as the part locations.

However, the CPR, or even the RCPR, techniques do not always succeed in correctly estimating the object's shape, especially when dealing with very challenging faces, in terms of pose and occlusions.

Currently, such object shape estimation failures need to be detected manually by an operator, which is a tedious and time-consuming process.

Thus, there remains a significant need for automatically classifying the results provided by automatic shape estimation methods into good or bad results.

3. SUMMARY

The following presents a simplified summary of the disclosure in order to provide a basic understanding of some aspects of the disclosure. This summary is not an extensive overview of the disclosure. It is not intended to identify key or critical elements of the disclosure. The following summary merely presents some aspects of the disclosure in a simplified form as a prelude to the more detailed description provided below.

The disclosure sets out to remedy at least one of the drawbacks of the prior art with a method for classifying an object of a current image, a plurality of first landmarks representative of the shape of said object being associated with the current image, a first unique identifier being associated with each first landmark.

Such a method comprises:
  for at least a first landmark selected among the plurality of first landmarks, obtaining at least a first descriptor describing an area of the current image comprising said at least first selected landmark,
    said at least first landmark being selected according to its first identifier,
    said at least first landmark being selected when its first identifier corresponds to a second identifier of a second landmark, a second descriptor of which being used in a classifier for classifying said object,
  determining information representative of confidence of said shape according to said at least first descriptor and according to weighting information associated with said second descriptor.

The present disclosure thus relies on a novel and inventive approach for classifying an object of a current image.

Actually, the present disclosure benefits from the specific properties of a classifier of object of images, and rates the goodness of the estimated landmarks.

More precisely, said current image corresponds to a test image. Said test image is annotated with a plurality of first landmarks (the term "first" is always associated with the test image in the following, whereas the term "second" is always associated with the classifier). Each landmark of said plurality is identified by an identifier, which is permanent for a same type of object.

In other words, considering that the object corresponds to a human or animal face, sixty-eight landmarks will be used for example to annotate such a face, and a landmark located on the left corner of the left eye is always identified by the number seven, a landmark located on the centre of the left eye is always identified by the number eight, and a landmark located on the left eye right corner is always identified by the number nine, and so on.

It has to be noted that the method according to the present disclosure can be used to classify other types of objects than human or face animal, such as vehicles, plants or buildings that require to be located in an image for a post-processing.

Thus, the first landmarks used to annotate the test image are numbered in the same way as the second landmarks used by the classifier corresponding to a systematic approach to building classification models from an input data set.

Then, the classifier is able to provide the identifier of one second landmark (said identifier being called in the present disclosure "a second identifier"), whose descriptor (said descriptor being called in the present disclosure "a second descriptor") is the most discriminative for classifying an object with respect to a set of images on which the classifier has been previously trained (the test image does not belong to said set of training images).

Said second descriptor is provided by the classifier with weighting information associated with it.

Said second identifier is then used to select the first landmark used for annotating the test image presenting the same identifier.

Once said first landmark, presenting the same identifier as the second identifier provided by the classifier is obtained, the descriptor (called first descriptor) of the first landmark associated with it, is then used for determining the information representing a confidence of said shape estimation corresponding to the set of first landmarks used for annotating said test image.

Such determination requires as inputs both said first descriptor and also the weighting information associated with the second descriptor as provided by the classifier.

In other words, the method proposed according to the present disclosure take advantage of the previous learning of a classifier to directly select the first descriptor of the test image, which corresponds to the most discriminative second descriptor learnt by the classifier.

It has to be noted that according to the present disclosure, it is possible that the classifier is trained independently from the implementation of the present method. The only requirement is that the classifier is able to provide the identifier of such a discriminative second descriptor and the weighting information associated with it.

Thus, a global rate of the results provided by automatic shape estimation methods applied on a test image is obtained quickly and efficiently, which permits a real-time rating of a test image. In other words, an "online" evaluation of the shape annotation of a test image is possible.

According to a particular aspect of the present disclosure, said determining of information representative of confidence comprises comparing said at least first descriptor to a threshold associated with said at least second descriptor.

For example, if the value of said first descriptor is lower than said threshold, the information representative of confidence of the shape estimated in said test image is equal to a positive value of said weighting information and to a negative value otherwise.

Thus, a negative value of the information representative of confidence indicates directly, and for the overall test image, that the results provided by automatic shape estimation methods are bad results.

According to a further aspect of the present disclosure, said information representative of confidence is normalised to provide a probability value of confidence.

Indeed, a value of confidence in the form of a probability is sometimes easier to understand for an operator. Such a normalisation can consists in transforming a negative value, obtained after comparing said at least first descriptor to a threshold associated with said at least second descriptor, in a very low probability close to zero indicating that the test image does not contain any object or that the landmark annotation is erroneous, and on the contrary, in transforming a positive value in a probability comprised between 0.5 and 1.

According to an embodiment of the present disclosure, for said current image, first descriptors associated with each landmark of said plurality of first landmarks are concatenated, following an order depending on their identifier, to form a first vector, and for said classifier, second descriptors associated with each landmark of a plurality of second landmarks are concatenated, following said order depending on their identifier, to form a second vector.

Such a concatenation permits to optimise the process in terms of time since only one vector is processed. Moreover, such a concatenation provides a single vector, which represents the overall shape of the whole test image. Such an overall representation of the test image is relevant since the present disclosure aims at determining overall information representative of confidence for the whole test image and not information representative of confidence of a single landmark.

According to a particular aspect said classifier is an iterative classifier implementing a plurality of iterations, wherein, from the second iteration, each iteration uses the result of the previous iteration.

As a consequence, if the classifier is iterative, the method according to the present disclosure will be iterative too. In other words, the step of obtaining at least a first descriptor and then the determining of information representative of confidence, are both iterated to refine said information representative of confidence.

More precisely, the classifier provides a second identifier and the weighting information (and optionally threshold) associated with the second descriptor identified by said second identifier, which can be different from one iteration to another.

In other words, at the first iteration, the classifier provides a second identifier, for example the number seven (corresponding to the descriptor associated with a landmark located on the left corner of the left eye), and the weighting information (and optionally threshold) associated with the second descriptor identified by said second identifier numbered seven.

Also identified by the number seven, a first descriptor associated with the test image is selected and then used for determining information representative of confidence of the overall shape annotated by the plurality of first landmarks of the test image.

Such information representative of confidence determined at the first iteration is then refined at a second iteration at least.

At the second iteration, the classifier provides a second identifier, for example the number fifteen (corresponding to the descriptor associated with a landmark located on the nose centre), and the weighting information (and optionally threshold) associated with the second descriptor identified by said second identifier numbered fifteen.

Also identified by the number fifteen, a first descriptor associated with the test image is selected and then used for refining information representative of confidence obtained at the first iteration, and so on.

According to a particular feature of the present disclosure, said classifier belongs to the group comprising:
 a classifier implementing an Adaboost algorithm,
 a classifier implementing binary decision trees,
 a support vector machine classifier,
 a nearest neighbour classifier.

As already mentioned above, a classification technique, or a classifier, is a systematic approach to building classification models from an input data set. There are several techniques, each one employing a learning algorithm to identify a model that best fits the relationship between the attribute set and class label of the input data, and also correctly predict the class labels of test data, which are examples it has never seen before.

The Adaboost algorithm as disclosed by R. Shapire et al. ("*A brief introduction to Boosting*"), IEEE International Conference on Artificial Intelligence, 1999 is based on the use of a weak learner to form a highly accurate prediction rule by calling the learner repeatedly on different distributions over the training examples. A weak learner, or weak classifier, is a classifier with generalization error better than random guessing. The weak learning algorithm, or weak learner, is assumed to be able to find weak classifiers that classify the data correctly with a probability higher than 50%. Boosting combines a set of weak learners into a strong learner with a much better classification performance than each individual weak learner.

Another classification technique is binary decision trees. The main task of a binary decision tree is to solve a classification problem by asking a series of carefully crafted questions about the attributes of the test record. Each time an answer is received, a follow-up question is asked until a conclusion about the label of the record is reached. The series of questions and their possible answers can be organized in the form of a decision tree, which is a hierarchical structure consisting of nodes and directed edges. The tree has three types of nodes: a root node that has no incoming edges and zero of more outgoing edges, internal nodes, each of which has exactly one incoming edge and two or more outgoing edges, and leaf or terminal nodes, each of which has exactly one incoming edge and no outgoing edges. Each leaf is assigned to a class label. The non-terminal nodes contain attribute test conditions to separate records that have different characteristics.

Another classification technique is the support vector machine (SVM) classifier as disclosed by V. Vapnik et al. ("*Support vector method for function approximation, regression estimation, and signal processing*"), Advances in Neural Information Processing systems 9, 1996, is a representation of the data as points in space, mapped so that the examples of the separate categories are divided by a clear gap that is as wide as possible. New data are then mapped into that same space and predicted to belong to a category based on which side of the gap they fall on.

Another classification technique is the nearest neighbour classification as disclosed by O. Boiman et al. ("*In defense of Nearest-Neighbor based image classification*"), IEEE Conference on computer Vision and Pattern Recognition, 2008, and classifies an image by the class of its nearest (most similar) image in the database.

According to a particular feature of the present disclosure, said first and second descriptors are of the same type, said type belonging to the group comprising:
 a histogram of oriented gradients,
 information representing a contour,
 a luminance value,
 an intensity value,
 a texture value.

The histogram of oriented gradients, as disclosed by N. Dalai et al. ("*Histograms of oriented gradients for human detection*"), IEEE Conference on computer Vision and Pattern Recognition, 2005, is a feature descriptor used in computer vision for object detection.

The main idea behind the histogram of oriented gradients descriptor is that the local appearance of objects as well as the shape within an image can be described by the distribution of intensity gradients or edge directions. Hence, the image is divided into small regions called cells, the user can choose the size of these cells, as well as the overlap between two adjacent cells, and the number of orientation bins for each histogram, then a histogram of gradient directions is compiled for the pixels within each cell. The final vector of features is the concatenation of all these histograms. In order to overcome the problem of changes in illumination and shadowing, an histogram equalization can be performed on the whole image before the extraction of HOG features.

Differently, said type can also be an intensity value representing for example a grey level, or a particular colour in the RGB space or a triplet for each of the three colours of the RGB space, etc.

According to an embodiment of the present disclosure, said method comprises a previous training of said classifier.

Indeed, the classifier can be trained separately from the implementation of the present disclosure, by a different device, and the trained classifier is then provided as an input of said method.

Nevertheless, the present method can also implement the training of the used classifier. Such a training has to be performed before the steps of obtaining at least a first descriptor and then the determining of information representative of confidence. Said training is advantageously performed "offline" in order to permit a real time processing of the test image.

According to a particular feature of said embodiment, said training of said classifier is performed by using a dataset of training images comprising:
 a first set of training images, which provide a positive classifying result when being processed by said classifier, and
 a second set of training images, which provides a negative classifying result when being processed by said classifier.

As a consequence, the classifier is also trained to provide a negative classifying result.

More precisely, said second set of training images contains images where the object is not present and/or images where object landmark annotation is erroneous.

In this way, the classifier is able to provide a ranking of training images, even if some of these training images present an erroneous landmark annotation. Thus, the results provided by such a classifier are more relevant trying to determine confidence information of a test image.

According to another embodiment, said method further comprises a previous landmark annotating of said object of said current image.

Indeed, the test image already annotated by an external device can be provided directly as an input of the method for classifying an object of said test image according to the present disclosure.

Nonetheless, such annotation can also be implemented previous to the steps of obtaining at least a first descriptor and then the determining of information representative of confidence.

According to a particular aspect of this another embodiment, said landmark annotating of said object of said current image is performed by using one of the methods belonging to the group comprising:

a cascaded pose regression, a robust cascaded pose regression.

Another aspect of the present disclosure pertains to a device for classifying an object of a current image, a plurality of first landmarks representative of the shape of said object being associated with the current image, a first unique identifier being associated with each first landmark, said device comprising a processor configured to control:

for at least a first landmark selected among the plurality of first landmarks, a module for obtaining at least a first descriptor describing an area of the current image comprising said at least first selected landmark, said at least first landmark being selected according to its first identifier, said at least first landmark being selected when its first identifier corresponds to a second identifier of a second landmark, a second descriptor of which being used in a classifier for classifying said object, a module for determining information representative of confidence of said shape according to said at least first descriptor and according to weighting information associated with said second descriptor.

Such a device is adapted especially for implementing the method for classifying an object of a current image.

The present disclosure also concerns a computer program product downloadable from a communication network and/or recorded on a medium readable by a computer and/or executable by a processor, comprising program code instructions for implementing a method for classifying an object of a current image as described above.

The present disclosure also concerns a non-transitory computer-readable medium comprising a computer program product recorded thereon and capable of being run by a processor, including program code instructions for implementing a method for classifying an object of a current image as described above.

Such a computer program may be stored on a computer readable storage medium. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

It is to be understood that both the foregoing general description and the following detailed description are exemplary and explanatory and are not restrictive of the disclosure, as claimed.

It must also be understood that references in the specification to "one embodiment" or "an embodiment", indicate that the embodiment described may include a particular feature, structure, or characteristic, but every embodiment may not necessarily include the particular feature, structure, or characteristic.

Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specific nature of the disclosure as well as other objects, advantages, features and uses of the disclosure will become evident from the following description of embodiments taken in conjunction with the accompanying drawings.

4. BRIEF DESCRIPTION OF THE DRAWINGS

Embodiments of the disclosure can be better understood with reference to the following description and drawings, given by way of example and not limiting the scope of protection, and in which.

Similar or same elements are referenced with the same reference numbers. The components in the figures are not necessarily to scale, emphasis instead being placed upon illustrating the principles of the disclosure.

5. DETAILED DESCRIPTION

General Principle

Figure 1:
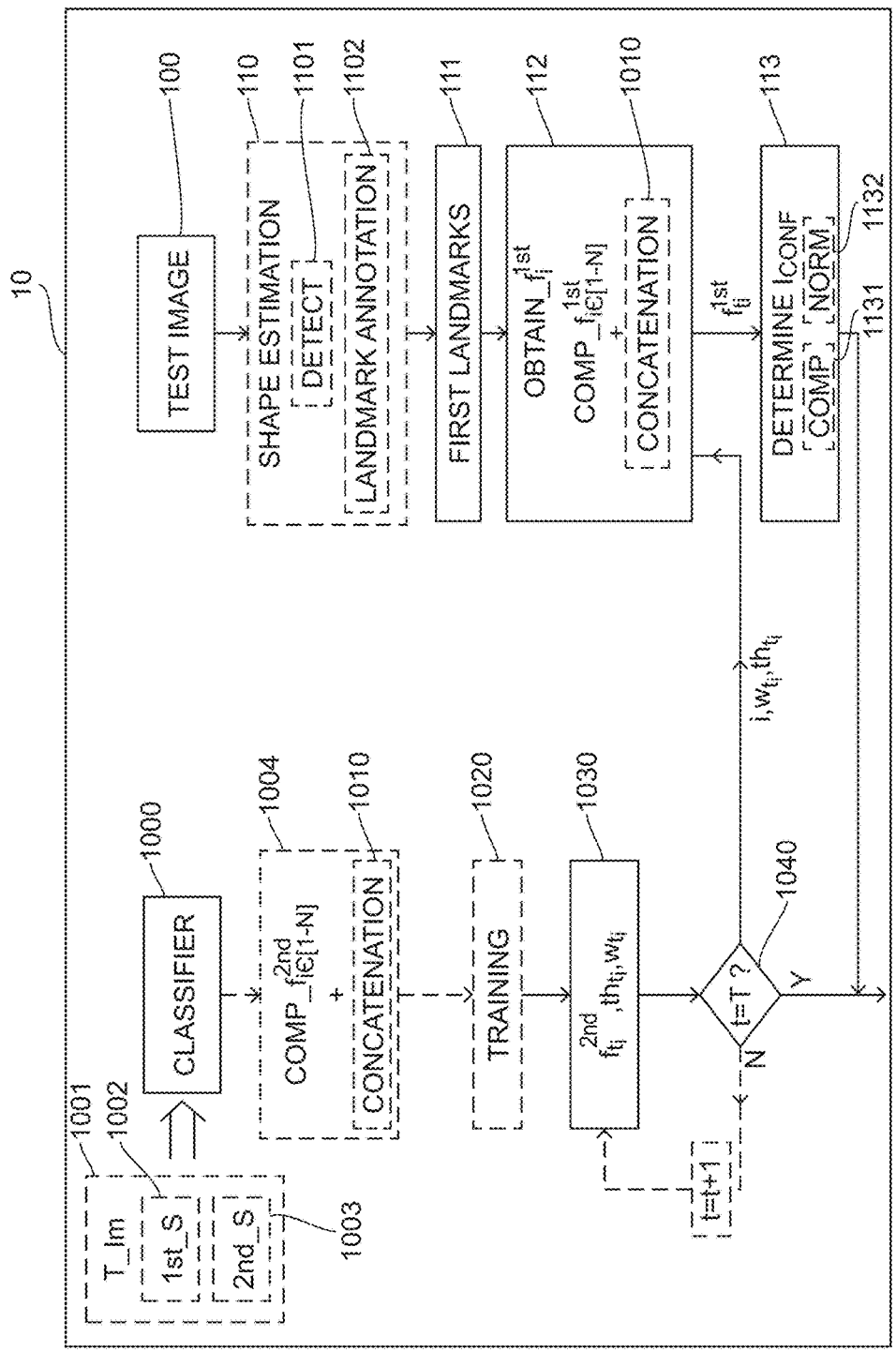
FIG. 1 shows schematically a diagram of the main steps of the method for classifying an object of a current image according to the present disclosure.

The general principle of the present disclosure consists in a new way for classifying, in real-time, an object of a current image, by determining information representative of confidence for the overall current image, said determining taking into account of a training result provided by a classifier previously trained with a dataset of training images, which does not comprise said current image, called in the following the test image.

A description will now be given of a method, a corresponding device and a computer-readable storage medium for classifying an object of a current image.

This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof.

Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as"/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks might occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for classifying an object of a current image but extends to the classifying of a plurality of objects within a current image, or to an object represented in a sequence of images because an object of each image belonging to said sequence is sequentially classified as described below.

The Method for Classifying an Object of an Image

FIG. 1 shows schematically a diagram of the main steps of the method (10) for classifying an object of a current image according to the present disclosure, said method being performed by a device for classifying an object of a current image, called test image (100) in the following.

According to the present disclosure, the method (10) for classifying an object of a test image (100) can be advantageously performed online and consists in applying a result provided by a trained classifier (1000) to a test image (100).

Said test image is landmark annotated (1102) with a plurality (111) of first landmarks representative of the shape of said object. Each landmark of said plurality comprising N landmarks is identified by an identifier i with $i \in [1; N]$, which is permanent for a same type of object.

For example, considering that the object corresponds to a human or animal face, N=68 landmarks will be used for example to annotate such a face, and a landmark located on the left corner of the left eye is always identified by the number seven, a landmark located on the centre of the left eye is always identified by the number eight, and a landmark located on the left eye right corner is always identified by the number nine, and so on.

Optionally (as represented in dotted lines), said landmark annotation (1102) can be performed within a phase of shape estimation (110) by the device for classifying an object of a current image according to the present disclosure, or can be performed by a separate device and then transmitted to the device for classifying an object of a current image according to the present disclosure.

Such a shape estimation (110) can be performed by using the cascaded pose regression technique (CPR) as disclosed by P. Dollar et al. ("Cascaded Pose Regression") IEEE Computer Vision and Pattern recognition 2010 pp 1078-1085, or the robust cascaded pose regression (RCPR) derived from CPR and that deals with occlusions as disclosed by one the inventors, X. P. Burgos-Artizzu et al. ("Robust face landmark estimation under occlusion"), IEEE International Conference on Computer Vision, Sydney 2013.

Figure 4A:
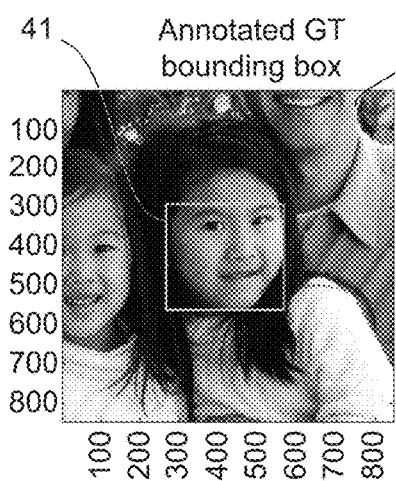
FIGS. 4A and 4B illustrate a first example of a method for landmark annotating an image.
Figure 4B:
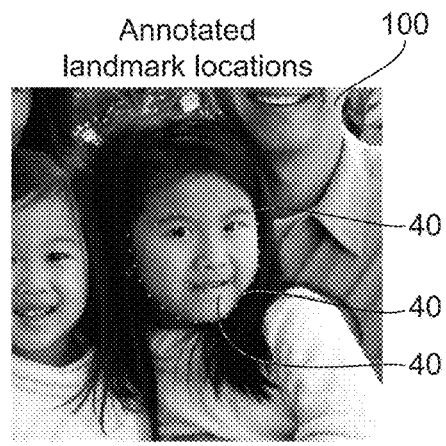

FIGS. 4A and 4B illustrate such a shape estimation obtained for a test image (100) with a model, which does not considers occlusions and which estimates N=68 landmarks.

As can be seen, on FIG. 4A, such a shape estimation (110) comprises first applying (1101) a pre-trained face detector to detect the face in a bounding box (41), and then applying (1102) a pre-trained CPR or RCPR using this bounding box (41) to obtain landmarks (40) locations.

Such a pre-trained face detector can be obtained using a technique of the prior art such as the one disclosed by P.

Viola et al. ("*Robust Real-time Face detection*") International Journal of computer Vision, vol. 57, no. 2, pp. 137-154, 2004.

Figure 5:
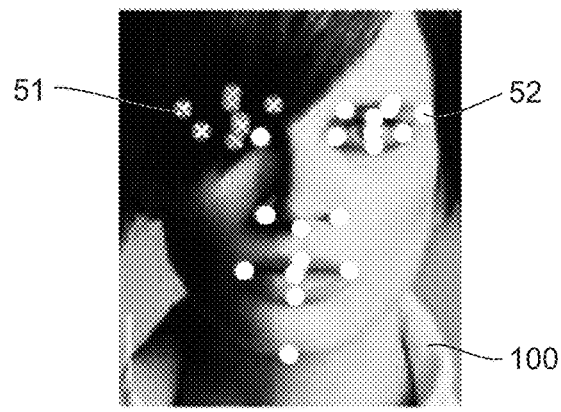
FIG. 5 illustrates a second example of a method for landmark annotating an image.

FIG. 5 illustrates such a shape estimation obtained for a test image (100) with a model, which considers occlusions and which estimates N=29 landmarks. Indeed, the landmarks (51) (represented by crosses) correspond to the landmarks of the left eye eyebrow even if they are overlapped by a strand of hair, whereas the other landmarks (represented by points) corresponds to face points of interest, which are not overlapped.

Once said test image (100) already annotated with a plurality of first landmarks is obtained (received from another device or computed within the proposed method), a first descriptor $f_i^{1st}$ associated with each landmark i with $i \in [1; N]$ is obtained (112).

Such N first descriptors are of the type belonging to the group comprising:
a histogram of oriented gradients,
information representing a contour,
a luminance value,
an intensity value,
a texture value.

For example, according to the embodiment illustrated by FIG. 1, each descriptor is a histogram of oriented gradients, as disclosed by N. Dalal et al. ("*Histograms of oriented gradients for human detection*"), IEEE Conference on computer Vision and Pattern Recognition, 2005.

Figure 3:
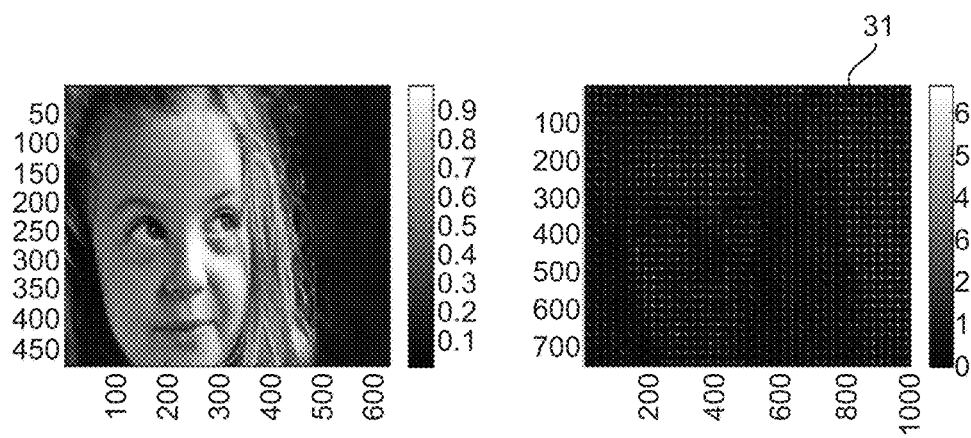
FIG. 3 represents an example of a type of a descriptor than can be obtained from a current image according to the present disclosure.

As an illustration, FIG. 3 represents all the HOG descriptors that can be extracted over an image containing a face using bins of size sixteen and nine orientations.

Then, according to a particular aspect of the embodiment illustrated by FIG. 1, all the first descriptors, $f_1^{1st} \ldots, f_i^{1st} \ldots f_N^{1st}$ are concatenated (1010) to form a first vector. Said vector is representative of the overall shape of said test image (100).

Within such an obtained vector of concatenated descriptors, each descriptor being associated with a landmark identified by the first identifier i, one first descriptor $f_i^{1st}$ is selected when its first identifier i corresponds to a second identifier of a second landmark whose second descriptor $f_i^{2nd}$ has been identified (1030) in a classifier (1000) for good classifying objects in a dataset 1001 of training images.

It has to be noted that the type of first descriptors, obtained (112) for the test image, is of the same type as the one used by the classifier (1000). In other words, said first descriptor $f_i^{1st}$ and said second descriptor $f_i^{2nd}$ are for example both HOG descriptors.

Then, said first descriptor $f_i^{1st}$ of the test image (100) and weighting information $w_i$ associated with the second descriptor $f_i^{2nd}$ are used for determining (113) information $I_{CONF}$ representative of confidence of the shape corresponding to said plurality (111) of first landmarks.

According to a particular aspect of the embodiment illustrated by FIG. 1, said determining (113) comprises comparing (1131) said first descriptor $f_i^{1st}$ with a threshold $th_i$ associated with the second descriptor $f_i^{2nd}$.

For example, said information $I_{CONF}$ representative of confidence corresponds to value H such that:

$$H = \begin{cases} w_{t_i} & \text{if } f_i^{1st} < th_{t_i} \\ -w_{t_i} & \text{otherwise} \end{cases}$$

In other words, a negative value H of the information $I_{CONF}$ representative of confidence indicates directly, and for the overall test image, that the results provided by automatic shape estimation methods are bad results.

In order to improve the understanding of an operator designed for post-processing such a test image, and in particular in charge of checking that the shape estimation results are good, such value H is normalized 1132 to provide a probability value of confidence.

When an application of face recognition is aimed at for example, a very low confidence (for example between 0 and 0.3) indicates with high probability that the processed image patch does not represent a face, in other words, a likely failure of the face detector. Thus, the confidence indicator can help improve the face detection performance, based on shape cues that are not taken into account by standard face detectors.

In case of a "middle" confidence (for example between 0.3 and 0.7), indicating with a high likelihood correct face detection but poor quality landmark localization, the applicative module using facial landmark estimation can advantageously be switched to a fall-back mode not relying on the facial landmark estimation results.

Indeed, since the features used for the classification are indexed by the locations of the landmarks, this probability not only provides an indication on the presence of a face in the test image patch (very low values), but also an indication on the accuracy of landmark estimation (moderately high values in the range [0.5 . . . 0.9]).

As can be seen on the embodiment illustrated by FIG. 1, the trained classifier used for providing the identifier used to select (or extract) said first descriptor $f_i^{1st}$ is an iterative classifier.

In other words, such classifier implements T iterations during its training to determine the second descriptor $f_{t_i}^{2nd}$, which is the most discriminative at each iteration to refine the classification accuracy, each iteration taking into account the result of the previous iteration.

Thus, considering this aspect, during the online processing of the test image according to the present disclosure, the information $I_{CONF}$ representative of confidence is refined iteratively too.

However, when a quick processing of each test image (100) is aimed at, it is possible to implement just only a single iteration.

For example, at a first iteration t=1, the classifier (1000) provides (1030) the identifier 34 to select the first descriptor $f_{34}^{1st}$, which is then compared to the threshold $th_{34}$ also provided (1030) by the classifier (1000) and depending on this comparison (1131) the value $V_1$ of the information $I_{CONF}$ will be $\pm w_{34}$.

At a second iteration t=2, the classifier (1000) provides (1030) the identifier 47 to select the first descriptor $f_{47}^{1st}$, which is then compared to the threshold $th_{47}$ also provided (1030) by the classifier (1000) and depending on this comparison (1131) the value $V_2$ of the information $I_{CONF}$ will be $V_1 \pm w_{47}$ and so on for the following iterations.

Thus, at each iteration the value $V_t$ of the information $I_{CONF}$ representative of confidence is such that at an iteration t:

$$V_t = \begin{cases} V_{t-1} + w_{t_i} & \text{if } f_{t_i}^{1st} < th_{t_i} \\ V_{t-1} - w_{t_i} & \text{otherwise} \end{cases}.$$

It has to be noted that the classifier used according to the present disclosure is already trained and able to provide online the triplet consisting of the identifier, the threshold and the weighting for performing the method according to the present disclosure for a determining in real time the information $I_{CONF}$ representative of confidence of the test image (100).

Optionally, and as represented on FIG. 1, the method according to the present disclosure can also comprise a previous training (1020) of said classifier (1000). Said training (1020) is advantageously performed offline once and for all and is valuable for later testing any test images.

Figure 2:
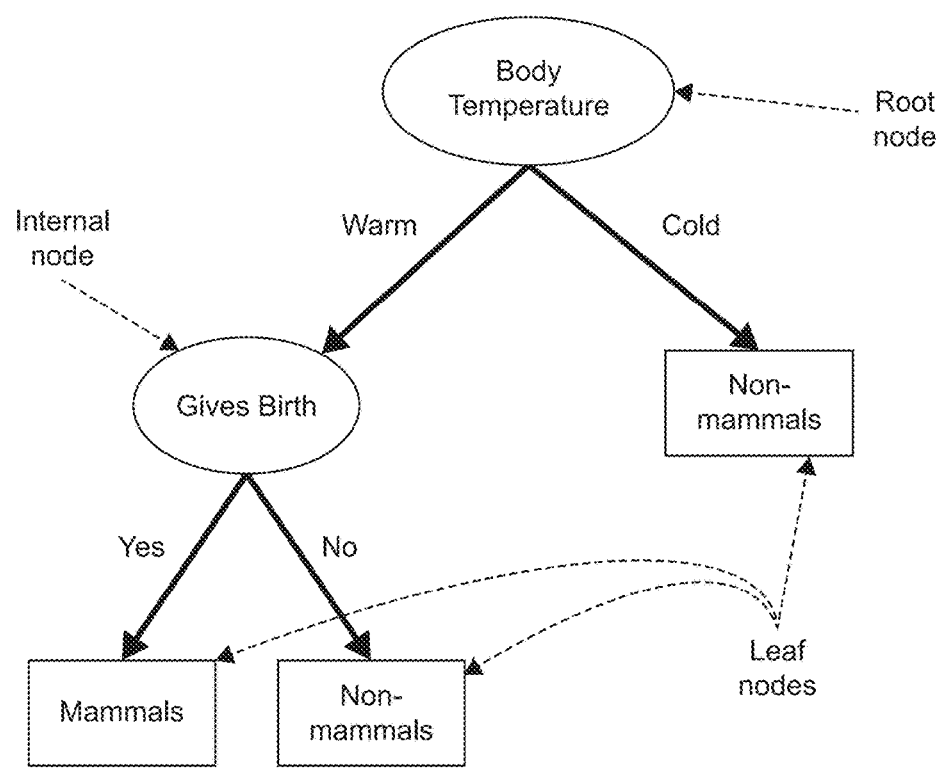
FIG. 2 represents an example of classifier, which can be used according to the present disclosure.

According to a first example, such a classifier uses binary decision trees for classification, an example of which being represented on FIG. 2.

According to another example, such a classifier implements an Adaboost algorithm as disclosed by R. Shapire et al. ("*A brief introduction to Boosting*"), IEEE International Conference on Artificial Intelligence, 1999, which is an iterative classifier.

Generally, such an algorithm's input consists of a dataset of positive and negative examples xi of the object to detect, annotated with the ground truth annotation $y_i$ in $\{-1, +1\}$, where $y_i=+1$ is a positive example and $y_i=-1$ is a negative example. Each (positive or negative) sample (xi,yi) in the dataset is assigned a weight $w_i$.

At each stage (i.e. iteration) t of the algorithm, a weak learner h(x) is selected that minimizes the weighted sum of the errors for the points misclassified using this weak learner.

Such a weak learner is selected among T weak learners, the number T corresponding also to the number of iterations.

Next, the weights of the training samples are updated so that the misclassified samples get a higher weight and the correctly classified samples a lower weight. The final strong learner is computed as a weighted sum of the weak learners computed at each stage t. In addition, weighting parameters $\alpha_t$ are computed as a function of the classification error for the weak learner $h_t$: the lower the error, the higher the value of the weighting parameter $\alpha_t$.

During the training 1020, the value of the strong classifier H(x) can be used to derive an estimate of the posterior class probability, in other words, obtaining the relationship between the output of said classifier and the conditional probabilities assuming that there is a distribution on y (i.e. negative training sample) for each x (i.e. positive training sample). As disclosed by C. Rudin ("*Boosting, MIT* 15.097 *Course Notes*"), MIT OpenCourseWare, 2012, this probability can be shown to be well approximated by:

$$P(y = +1 \mid x) = \frac{1}{1 + e^{-2H(x)}}.$$

More precisely, in the case of the present disclosure, wherein according to a particular embodiment said classifier implements an Adaboost algorithm, the offline training (1020) of said classifier is performed by using a dataset (1001) of training images comprising:
- a first set (1002) of training images, which provide a positive classifying result when being processed by said classifier, and
- a second set (1003) of training images, which provides a negative classifying result when being processed by said classifier, said second set (1003) of training images contains images where the object is not present and/or images where object landmark annotation is erroneous.

For example, said dataset (1001) comprises face and non-face images. In this dataset, face images are annotated with the location of the face, marked as a bounding rectangle (similar to the one (41) as illustrated in FIG. 4A but in this case such a bounding rectangle is marked in training images of the dataset (1001)), and the ground truth locations of the landmarks (similar to the ones (40) as illustrated in FIG. 4B but in this case such a bounding rectangle is marked in training images of the dataset (1001)).

Bounding boxes are randomly selected in the non-face second set (1003) of training images, and a set of landmarks locations is generated within each such bounding box. For example, the set of landmarks locations for each bounding box can be set to the average set of landmarks locations for the face bounding box examples in the negative training images (1003) of the whole training dataset (1001).

More precisely, previously to this offline training (1020) second descriptors $f_i^{2nd}$ (the index i representing the landmark numbered i) are computed (1004) and then concatenated (1010) for each training image of the dataset (1001) comprising both positive (1001) and negative (10020) samples. It has to be noted that the type of first descriptors $f_i^{1st}$, obtained (112) for the test image, is of the same type as the one used by the classifier (1000). For example, said first descriptor $f_i^{1st}$ and said second descriptors $f_i^{2nd}$ are HOG descriptors.

Specifically, the HOG descriptors are computed within rectangles centred on each of the landmarks. The dimensions of the rectangles are normalized to a predetermined value, computed from the locations of the landmarks.

Then, the Adaboost classifier is offline trained (1020) on the HOG features. Because the landmarks are attached to semantic points of interest in the face, the distribution of gradients in the rectangles around the landmarks should be roughly invariant across the face image patches, and strongly different from the distributions of gradients around non-face patches. Thus, the computed HOG features should well discriminate faces from non-faces, and are therefore a good choice of features for a face classifier.

According to a variant, for both the training images and the test a predetermined subset comprising M (with M<N) landmarks among the N original landmarks is defined), and the computation of the HOG features is restricted to this subset only.

In other words, instead of computing first descriptors $f_i^{1st}$ and second descriptors $f_i^{2nd}$ for each sixty-eight landmarks respectively for the training images or for the test image the computation is reduced to compute only thirty-four first descriptors $f_i^{1st}$ and second descriptors $f_i^{2nd}$ respectively (one of two). Such a reduced subset can be obtained randomly, according to a predetermined rule such as the rule consisting in computing one descriptor of two, or can be defined manually by an operator.

Such a reduced subset permits thus to reduce the processing time of the steps of computing (1004) second descriptors $f_i^{2nd}$ and obtaining (112) first descriptors $f_i^{1st}$ respectively.

Structures of the Device for Classifying an Object of an Image

On FIG. 1, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 6:
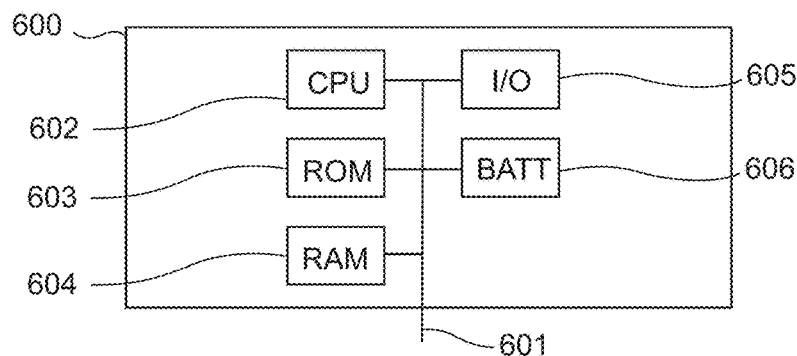
FIG. 6 shows an example of architecture of a device in accordance with an embodiment of the disclosure.

FIG. 6 represents an exemplary architecture of a device 600, which may be configured to implement a method for classifying an object as described in relation with FIG. 1.

Device 600 comprises following elements that are linked together by a data and address bus 601:
- a microprocessor 602 (or CPU), which is, for example, a DSP (or Digital Signal Processor);
- a ROM (or Read Only Memory) 603;
- a RAM (or Random Access Memory) 604;
- an I/O interface 605 for transmission and/or reception of data, from an application; and
- a battery 606.

According to a variant, the battery 606 is external to the device. Each of these elements of FIG. 6 is well known by those skilled in the art and won't be disclosed further. In each of mentioned memory, the word «register» used in the specification can correspond to area of small capacity (some bits) or to very large area. ROM 603 comprises at least a program and parameters. Algorithm of the methods according to the disclosure is stored in the ROM 603. When switched on, the CPU 602 uploads the program in the RAM and executes the corresponding instructions.

RAM 604 comprises, in a register, the program executed by the CPU 602 and uploaded after switch on of the device 600, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

According to a specific embodiment, said current image is obtained from a source. For example, the source belongs to a set comprising:
- a local memory (603 or 604), e.g. a video memory or a RAM (or Random Access Memory), a flash memory, a ROM (or Read Only Memory), a hard disk;
- a storage interface, e.g. an interface with a mass storage, a RAM, a flash memory, a ROM, an optical disc or a magnetic support;
- a communication interface (605), e.g. a wire line interface (for example a bus interface, a wide area network interface, a local area network interface) or a wireless interface (such as a IEEE 802.11 interface or a Bluetooth® interface); and
- a picture capturing circuit (e.g. a sensor such as, for example, a CCD (or Charge-Coupled Device) or CMOS (or Complementary Metal-Oxide-Semiconductor)).

According to different embodiments, a bitstream delivered by said device is sent to a destination. As an example, said bitstream is stored in a local or remote memory, e.g. a video memory (604) or a RAM (604), a hard disk (603). In a variant, said bitstreams is sent to a storage interface, e.g. an interface with a mass storage, a flash memory, ROM, an optical disc or a magnetic support and/or transmitted over a communication interface (605), e.g. an interface to a point to point link, a communication bus, a point to multipoint link or a broadcast network.

Implementations of the various processes and features described herein may be embodied in a variety of different equipment or applications. Examples of such equipment includes said device, a post-processor processing output from a decoder, a pre-processor providing input to an encoder, a video coder, a video decoder, a video codec, a web server, a set-top box, a laptop, a personal computer, a cell phone, a PDA, and any other device for processing a picture or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, resident software, micro-code, and so forth, or an embodiment combining software and hardware aspects that can all generally be referred to herein as a "circuit", "module", or "system".

When the present principles are implemented by one or several hardware components, it can be noted that a hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas), which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

Furthermore, aspects of the present principles can take the form of a computer readable storage medium. Any combination of one or more computer readable storage medium(s) may be utilized.

Thus for example, it will be appreciated by those skilled in the art that the block diagrams presented herein represent conceptual views of illustrative system components and/or circuitry embodying the principles of the disclosure. Similarly, it will be appreciated that any flow charts, flow diagrams, state transition diagrams, pseudo code, and the like represent various processes which may be substantially represented in computer readable storage media and so executed by a computer or a processor, whether or not such computer or processor is explicitly shown.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for classifying an object of a current image, a plurality of first landmarks representative of the shape of said object being associated with the current image, a first unique identifier being associated with each first landmark, the method comprising:
    for at least a first landmark selected among the plurality of first landmarks, obtaining at least a first descriptor describing an area of the current image comprising said at least first selected landmark,
    said at least first landmark being selected when its first identifier corresponds to a second identifier of a second landmark, a second descriptor of which being used in a classifier for classifying said object, wherein said classifier is an iterative classifier implementing a plurality of iterations, wherein, from the second iteration, each iteration uses the result of the previous iteration; and
    determining information representative of confidence of said shape according to said at least first descriptor and according to weighting information associated with said second descriptor.

2. The method for classifying an object of a current image according to claim 1, wherein said determining of information representative of confidence comprises comparing said at least first descriptor to a threshold associated with said at least second descriptor.

3. The method for classifying an object of a current image according to claim 1, wherein said information representative of confidence is normalised to provide a probability value of confidence.

4. The method for classifying an object of a current image according to claim 1, wherein:
    for said current image, first descriptors associated with each landmark of said plurality of first landmarks are concatenated, following an order depending on their identifier, to form a first vector, and
    for said classifier, second descriptors associated with each landmark of a plurality of second landmarks are concatenated, following said order depending on their identifier, to form a second vector.

5. The method for classifying an object of a current image according to claim 1, wherein said classifier belongs to the group comprising:
    a classifier implementing an Adaboost algorithm,
    a classifier implementing binary decision trees,
    a support vector machine classifier,
    a nearest neighbour classifier.

6. The method for classifying an object of a current image according to claim 1, wherein said first and second descriptors are of the same type, said type belonging to the group comprising:
    a histogram of oriented gradients,
    information representing a contour,
    a luminance value,
    an intensity value,
    a texture value.

7. The method for classifying an object of a current image according to claim 1, wherein said method comprises a previous training of said classifier.

8. The method for classifying an object of a current image according to claim 7, wherein said training of said classifier is performed by using a dataset of training images comprising:
    a first set of training images, which provide a positive classifying result when being processed by said classifier, and
    a second set of training images, which provides a negative classifying result when being processed by said classifier.

9. The method for classifying an object of a current image according to claim 8, wherein said second set of training images contains images where the object is not present and/or images where object landmark annotation is erroneous.

10. The method for classifying an object of a current image according to claim 1, wherein said method comprises a previous landmark annotating of said object of said current image.

11. The method for classifying an object of a current image according to claim 8, wherein said landmark annotating of said object of said current image is performed by using one of the method belonging to the group comprising:
- a cascaded pose regression,
- a robust cascaded pose regression.

12. A device for classifying an object of a current image, a plurality of first landmarks representative of the shape of said object being associated with the current image, a first unique identifier being associated with each first landmark, said device comprising a processor configured to:
- for at least a first landmark selected among the plurality of first landmarks, obtain at least a first descriptor describing an area of the current image comprising said at least first selected landmark,
    - said at least first landmark being selected according to its first identifier,
    - said at least first landmark being selected when its first identifier corresponds to a second identifier of a second landmark, a second descriptor of which being used in a classifier for classifying said object, wherein said classifier is an iterative classifier implementing a plurality of iterations, wherein, from the second iteration, each iteration uses the result of the previous iteration, and
- determine information representative of confidence of said shape according to said at least first descriptor and according to weighting information associated with said second descriptor.

13. The device for classifying an object of a current image according to claim 12, wherein said determining of information representative of confidence comprises comparing said at least first descriptor to a threshold associated with said at least second descriptor.

14. The device for classifying an object of a current image according to claim 12, wherein said information representative of confidence is normalised to provide a probability value of confidence.

15. The device for classifying an object of a current image according to claim 12, wherein:
- for said current image, first descriptors associated with each landmark of said plurality of first landmarks are concatenated, following an order depending on their identifier, to form a first vector, and
- for said classifier, second descriptors associated with each landmark of a plurality of second landmarks are concatenated, following said order depending on their identifier, to form a second vector.

16. The device for classifying an object of a current image according to claim 12, wherein said classifier belongs to the group comprising:
- a classifier implementing an Adaboost algorithm,
- a classifier implementing binary decision trees,
- a support vector machine classifier,
- a nearest neighbour classifier.

17. The device for classifying an object of a current image according to claim 12, wherein said first and second descriptors are of the same type, said type belonging to the group comprising:
- a histogram of oriented gradients,
- information representing a contour,
- a luminance value,
- an intensity value,
- a texture value.

18. The device for classifying an object of a current image according to claim 12, wherein said processor is further configured to process a previous training of said classifier.

19. The device for classifying an object of a current image according to claim 18, wherein said training of said classifier is performed by using a dataset of training images comprising:
- a first set of training images, which provide a positive classifying result when being processed by said classifier, and
- a second set of training images, which provides a negative classifying result when being processed by said classifier.

20. The device for classifying an object of a current image according to claim 19, wherein said second set of training images contains images where the object is not present and/or images where object landmark annotation is erroneous.

21. The device for classifying an object of a current image according to claim 12, wherein said method comprises a previous landmark annotating of said object of said current image.

22. The device for classifying an object of a current image according to claim 19, wherein said landmark annotating of said object of said current image is performed by using one of the method belonging to the group comprising:
- a cascaded pose regression,
- a robust cascaded pose regression.

23. A non-transitory computer-readable medium comprising a computer program product recorded thereon and capable of being run by a processor, including program code instructions for implementing the steps of the method for detecting at least one fitting error according to claim 1 when it is executed by a processor.

* * * * *